US006810823B2

(12) United States Patent
Mariman et al.

(10) Patent No.: US 6,810,823 B2
(45) Date of Patent: Nov. 2, 2004

(54) REMOVABLE SEED TRAY FOR A SEED METER

(75) Inventors: Nathan Albert Mariman, Geneseo, IL (US); Matthew Brian Hagen, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/218,647

(22) Filed: Aug. 14, 2002

(65) Prior Publication Data

US 2004/0050311 A1 Mar. 18, 2004

(51) Int. Cl.[7] ................................................ A01C 7/10
(52) U.S. Cl. ..................................................... 111/200
(58) Field of Search ........................ 111/14, 63, 73–78, 111/170, 174–188, 200, 925

(56) References Cited

U.S. PATENT DOCUMENTS 3,648,661 A * 3/1972 Moore
5,957,086 A * 9/1999 Gallardo ..................... 119/429

FOREIGN PATENT DOCUMENTS

| DE | 475 086 | 4/1929 |
|---|---|---|
| DE | 31 35 066 A1 | 3/1983 |
| GB | 1 557 333 A | 12/1979 |

OTHER PUBLICATIONS

John Deere Operator's Manual, "Maxemerge 2 Vacuum Metering Units", Cover page, Introduction, pp. 10–14 and 60–61, received by the Patent Department Mar. 16, 1987.
White, "6000 Series Planters", Cover page, pp. 16 & 17, date unknown.
Monosem, "The Precision Vacuum Planter", Cover page, pp. 305, received by the Patent Department Sep. 29, 1999.

* cited by examiner

Primary Examiner—Christopher J. Novosad

(57) ABSTRACT

A seed receiving tray is removeably mounted on a frame of a planting unit for receiving seed from a seed meter as it is cleared. The seed tray comprises a bowl portion for receiving the seed, a cross bar receiving portion for engaging a frame cross bar, and a hook for engaging a recess formed in the frame. The bowl portion has a first end wall that is provided with the cross bar receiving portion and a vertical support receiving portion. The bowl portion has a second end wall having the hook.

13 Claims, 2 Drawing Sheets

REMOVABLE SEED TRAY FOR A SEED METER

FIELD OF THE INVENTION

The present invention is directed to a seed tray for a seed meter of a planting unit wherein seed can be dumped form the seed meter into the seed tray when a planting operation is completed.

BACKGROUND OF THE INVENTION

When a farmer switches from one crop to another, or at the end of the planting season, it is necessary for the farmer to clean out all remaining seed located in the seed meter. Cleaning out seed meters is a time consuming process. One method has been to remove the seed meter and attached hopper and rotate the hopper and seed meter upside down to dump the seed into an awaiting receptacle.

To simplify this process some seed meters are provided with cleanout doors for dumping seed from the seed meter without removing the seed meter from the planting unit. Again the seed is directed to an awaiting receptacle.

SUMMARY OF THE INVENTION

It is an object of the present invention to provide a seed tray for the seed meter of the planting unit that can be readily attached to the planting unit frame below the seed meter.

A seed receiving tray is removeably mounted on a frame of a planting unit for receiving seed from a seed meter as it is cleared. The seed tray comprises a bowl portion for receiving the seed, a cross bar receiving portion for engaging a frame cross bar, and a hook for engaging a recess formed in the frame. The bowl portion has a first end wall that is provided with the cross bar receiving portion and a vertical support receiving portion. The bowl portion has a second end wall having the hook.

BRIEF DESCRIPTION OF THE DRAWINGS

FIG. 3 is an enlarged perspective view of the depth control handle.

DETAILED DESCRIPTION

Figure 1:
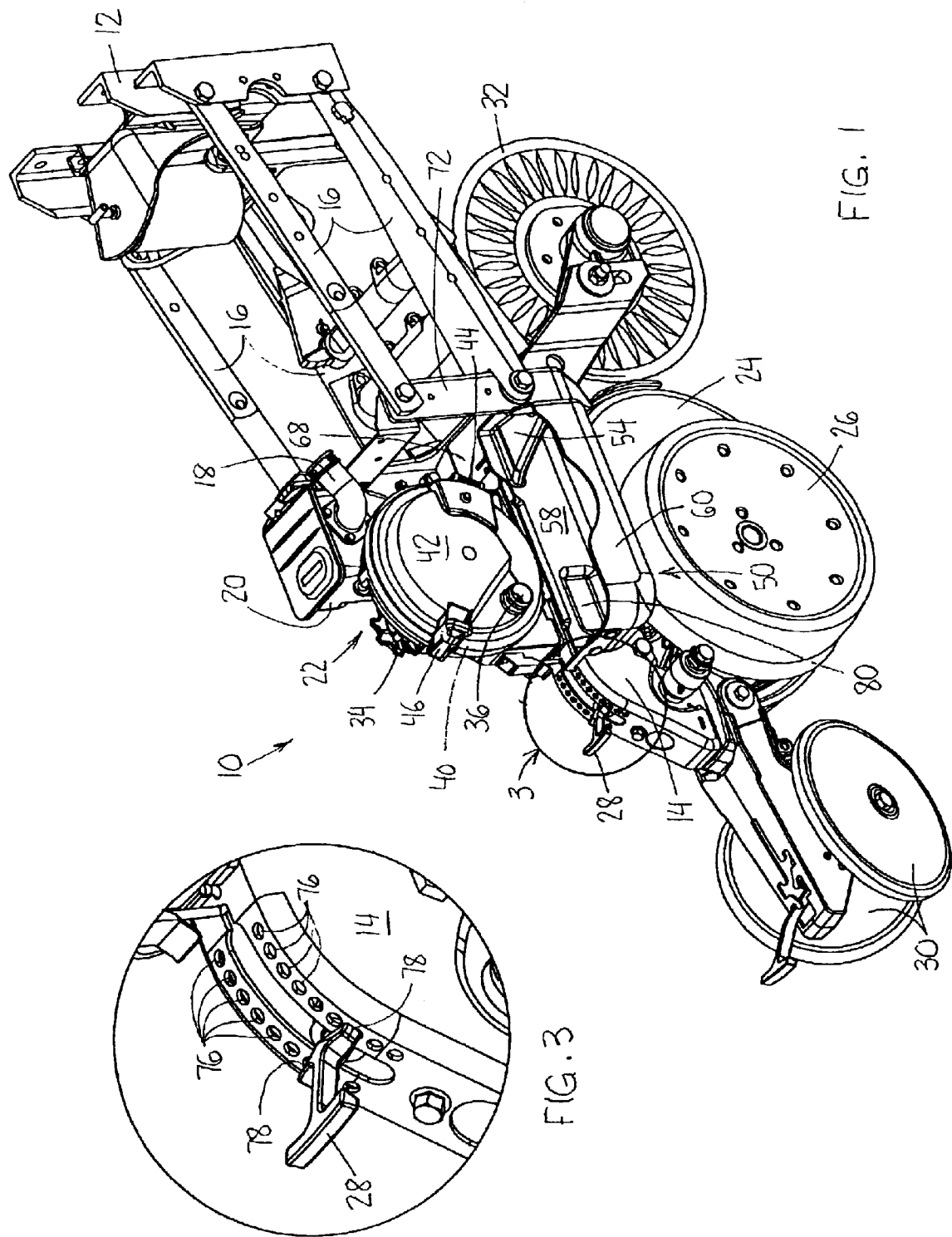
FIG. 1 is a perspective view of the seed tray mounted to the planting unit.
Figure 2:
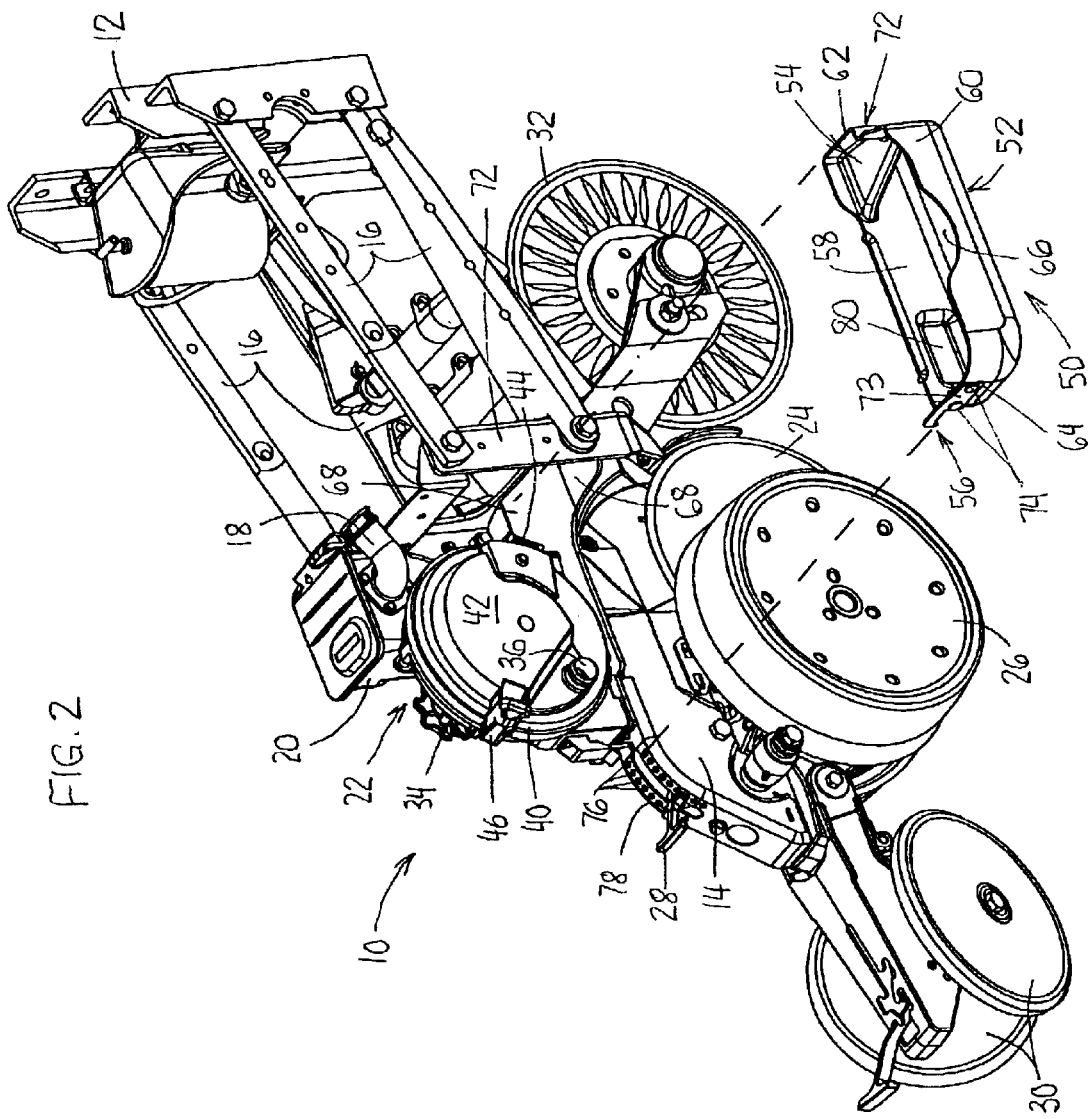
FIG. 2 is a perspective exploded view with seed tray removed form the planting unit.

The seeding machine 10 comprises an individual row crop planting unit that is mounted to a transverse toolbar, not shown, by U-bolts that engage a mounting plate 12. The planting unit is provided with a frame 14 that is coupled to the mounting plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through seed hose 18 to an auxiliary hopper 20 mounted on fame 14. Seed in the auxiliary hopper 20 is metered by a pneumatic pressure seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 30. A forward mounted coulter 32 is used for slicing through crop residue before it encounters the furrow opener 24.

The seed meter 22 is driven by a flexible rotatable drive shaft, not shown, that drives gear box 34. The flexible and rotatable drive shaft is of a type manufactured and marketed by Elliott Manufacturing Company, LLC of Binghamton, N.Y. A ground driven transmission, not shown, provides a rotational input into the flexible drive shaft. In this way the ground speed of the seeding machine 10 controls the speed of the seed meter 22.

The illustrated seed meter 22 is a vacuum seed meter. A pneumatic hose, not shown, is coupled to a seed meter pneumatic inlet 36 providing a vacuum source for the seed meter 22. Although the present invention is illustrated as a vacuum seed meter, it can also be used with a positive pneumatic pressure seed meters and mechanical seed meters.

When the farmer switches from one crop to another or at the end of the planting season it is necessary to clean out all remaining seed in the seed meter 22 and auxiliary hopper 20. For maintenance purposes the seed meter 22 comprises two housing portions. A first housing portion 40 is mounted to the frame 14 of the planting unit. The second housing portion 42 is pivotally mounted to the first housing portion 40 by hinge 44. The second housing portion 42 is latched to the first housing portion 40 by latch 46. To clean out the seed meter 22 the latch 46 is released and the second housing portion 42 is pivoted on hinge 44 relative to the first housing portion 40. The rotatable seed disc located in the seed meter housing is removed and the seed collecting in the seed meter 22 from the auxiliary hopper 20 spills out the seed meter 22 onto the ground or into a receiving receptacle.

The present invention is directed to providing a receiving receptacle in the form of a seed tray 50. The seed tray has a bowl portion 52, a cross bar receiving portion 54 and a hook 56. The bowl portion 52 has a first sidewall 58, a parallel second side wall 60, a first end wall 62, a parallel second end wall 64 and a bottom 66. The first end wall 62 is provided with the cross bar receiving portion 54. The cross bar receiving portion 54 comprises an indented section of the seed tray 50 for receiving horizontally extending cross bar 68 of the planter unit frame 14. The first end wall 62 is also provided with a vertical support receiving portion 70 that engages vertical support 72 of the planter unit frame 14.

The second end wall 64 is provided with the hook 56. The hook 56 is formed from a metal strap 73 that is bolted to the second end wall 64 by mounting bolts 74. The hook 56 engages a recess formed on the planting unit frame 14. The recess in the illustrated embodiment comprises one of the depth control apertures 76 located on the planter frame 14. The depth control apertures 76 are engaged by prongs 78 on the depth control handle 28.

The first side wall 58 is adjacent to the planting unit frame 14. The first side wall 58 is provided with an expanded boss portion 80 that rests against the planting unit frame to keep the seed tray 50 level when mounted to the planting unit frame 14.

The seed tray 50 is removeably mounted on the planting unit frame 14. To mount the seed tray 50, the seed tray 50 is inserted so that the cross bar receiving portion 54 engages the cross bar 68 and the vertical support receiving portion 70 bears against the vertical support 72. The hook 56 is then inserted into the topmost depth control aperture 76. The farmer can then open the seed meter 22 and remove the rotatable disc to clear seed from the seed meter 22 and auxiliary hopper 20 catching the seed in the seed tray 50. After the farmer has finished clearing one seed meter 22, the farmer can remove the seed tray 50 and move on to the next planting unit.

Having described the preferred embodiment, it will become apparent that various modifications can be made without departing from the scope of the invention as defined in the accompanying claims.

What is claimed is:

1. A planting unit for a seeding machine, the planting unit comprising:
   a frame having a cross bar and a recess;
   a seed meter for metering seed, the seed meter having a first housing portion and a second housing portion, the first housing portion being mounted to the frame, the second housing portion being mounted to the first housing portion;
   a furrow opener being mounted to the frame for forming a planting furrow;
   a seed tray having a bowl portion for receiving seed, a cross bar receiving portion that engages the cross bar on the frame, and a hook for engaging the recess on the frame, the seed tray being located below the second housing portion of the seed meter, whereby the seed tray catches seed from the seed meter when the second housing portion is opened relative to the first housing portion.

2. A planting unit as defined by claim 1 further comprising a depth gauge wheel for controlling the depth of the planting furrow formed by the furrow opener, the depth gauge wheel is operatively coupled to a depth control handle, the depth control handle has a prong that engages depth control apertures on the frame, one of the depth control apertures forming the recess for receiving the hook.

3. A planting unit as defined by claim 2 wherein the bowl portion has first and second sidewalls, first and second end walls, a bottom wall and an open top.

4. A planting unit as defined by claim 3 wherein the first end wall is provided with the cross bar receiving portion.

5. A planting unit as defined by claim 4 wherein the second end wall is provided with the hook.

6. A planting unit as defined by claim 5 wherein the first end wall is provided with a vertical support receiving portion for engaging a vertical support on the frame of the planting unit, the vertical support being adjacent to the cross bar.

7. A planting unit as defined by claim 6 wherein the cross bar extends horizontally.

8. A planting unit as defined by claim 1 wherein the bowl portion has first and second sidewalls, first and second end walls, a bottom wall and an open top.

9. A planting unit as defined by claim 8 wherein the first end wall is provided with the cross bar receiving portion.

10. A planting unit as defined by claim 9 wherein the second end wall is provided with the hook.

11. A planting unit as defined by claim 10 wherein the first end wall is provided with a vertical support receiving portion for engaging a vertical support on the frame of the planting unit, the vertical support being adjacent to the cross bar.

12. A planting unit as defined by claim 6 wherein the cross bar extends horizontally.

13. A planting unit as defined by claim 12 wherein the second housing portion of the seed meter is pivotally coupled to the first housing portion and held in place by a latch.

\* \* \* \* \*